April 26, 1927.

F. C. MARQUARDT 1,625,817

BED BOTTOM

Filed Dec. 31, 1924 · 2 Sheets-Sheet 1

INVENTOR.
Frederick C. Marquardt
BY
Erwin, Wheeler & Woolard
ATTORNEYS.

April 26, 1927.

F. C. MARQUARDT 1,625,817

BED BOTTOM

Filed Dec. 31, 1924

INVENTOR.
Frederick C. Marquardt
BY
Erwin Wheeler Woolard
ATTORNEYS.

Patented Apr. 26, 1927.

1,625,817

UNITED STATES PATENT OFFICE.

FREDERICK C. MARQUARDT, OF MILWAUKEE, WISCONSIN.

BED BOTTOM.

Application filed December 31, 1924. Serial No. 759,002.

This invention relates to improvements in bed bottoms, and more particularly, in connecting links for helical springs employed in bed bottoms or like upholstery.

It is the object of this invention to provide a bed bottom fabric including helical springs and to tie such springs together for the purpose of adequately resisting cross strains while permitting to each spring a maximum of freedom for independent movement. It is my purpose to provide a novel and improved system of linkage for tying the several springs of a bed bottom with a minimum number of parts and a maximum degree of flexibility, so as to enable each of the helical springs of the bed bottom to compress or expand individually without materially affecting the degree of compression or expansion of adjacent springs and without binding between the parts of the link system.

In the drawings.

Like parts are identified by the same reference characters throughout the several views.

Figure 1:
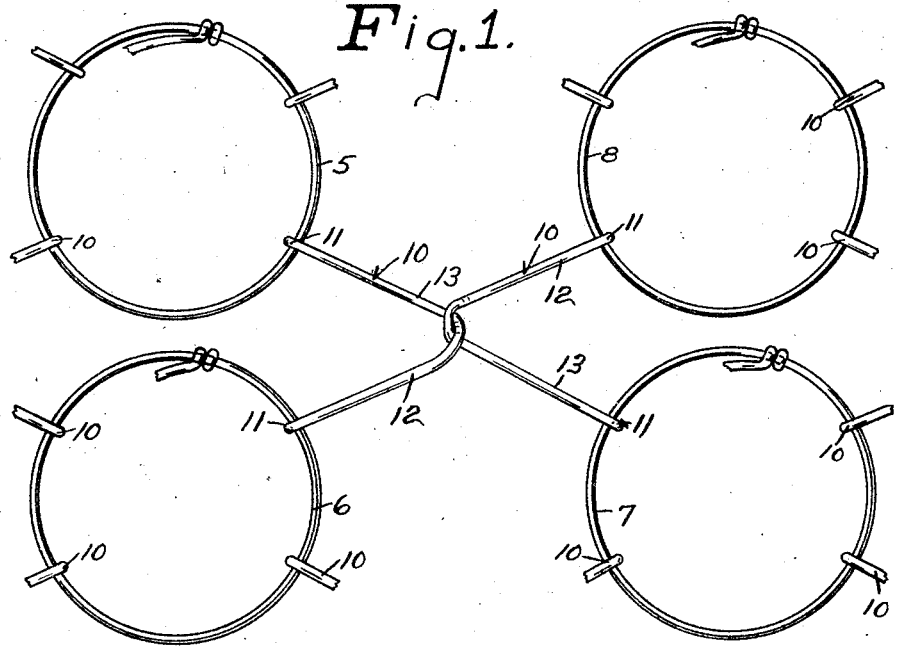
Figure 1 is a plan view of a fragmentary portion of a bed bottom embodying this invention.

At 5, 6, 7, and 8 I have illustrated in plan the tops of helical springs such as are commonly employed in bed bottoms and in other upholstery work. These several springs are joined to each other and to adjacent springs which surround them by means of a linkage system which is represented by the identical links 10 which are shown in Figure 1. Each of such links is composed of a single piece of wire hooked at its ends 11 for engagement with the top coil of the helical springs associated with such ends. The intermediate portion of each link is generally of the form of a letter V, as is clearly shown in the drawings. Links of this general character are well known, but in the ordinary link the two legs 12 and 13 of the V are substantially in a common plane throughout their length, including the apex or point at which the two legs are integrally joined.

Where the legs 12 and 13 of the V-shaped links 10 are wholly or substantially in a common plane there is a binding action which occurs at their apices, or point of interconnection. This binding action operates in one direction of relative oscillation of the links in such a manner that it is almost impossible for one of the springs to which the links are connected to move downwardly without downwardly deflecting all of the other springs to which the links are attached.

In accordance with the present invention, the leg 12 of each link is downwardly offset or inclined, as indicated at 14, and the leg 13 of each link has a corresponding upward inclination or offset, as indicated at 15. The oppositely inclined leg portions of each link are joined by a diagonally disposed intermediate portion 16 which comprises the apex of the V.

Figure 2:
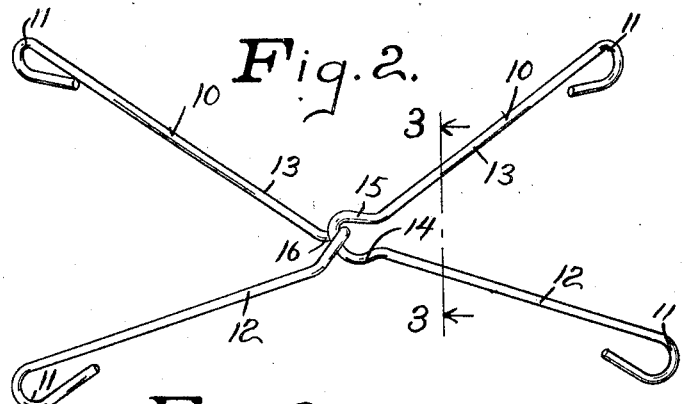
Figure 2 is a detail view in perspective of a number of links comprising a part of the system by which helical springs of a bed bottom are tied together in accordance with this invention.
Figure 3:
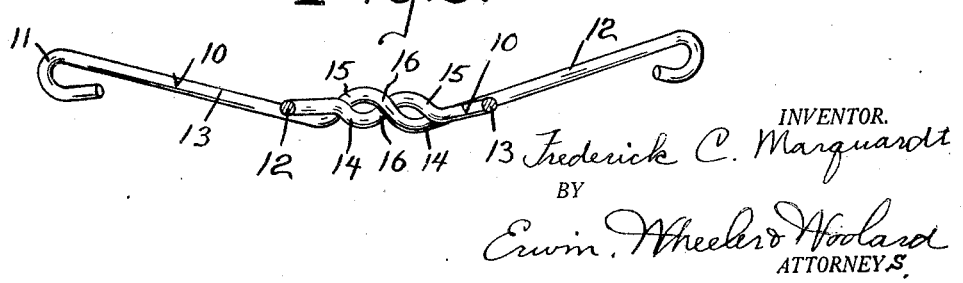
Figure 3 is a detail view taken in section, on a slightly enlarged scale, on the line indicated at 3—3 in Figure 2.

As is clearly shown in Figures 2 and 3, the intermediate portions 16 of the links cross each other substantially at right angles. These portions, however, are not straight but conform in general to the curve which it is customary to use at the apex of a V-shaped link. Thus, the two links will tend to keep themselves centered, each with respect to the other, in the relative positions in which they are indicated in Figure 3. It is particularly to be noted that when the links are in the illustrated relative positions they may readily be oscillated in either relative direction from the plane, which, under normal conditions, is common to both of them in a general way. The upwardly and downwardly offset portions 14 and 15 of the links afford clearance for this relative oscillation.

As a result of this link construction the links do not bind upon each other in either direction of movement within the normal degree of movement to which they are subject. As a result, it is possible to compress any of springs 5, 6, 7, or 8 without causing any material corresponding movement of any of the other springs. At the same time the several springs are tied together to resist any lateral movements, and the upper coils of the springs, together with the links, comprises a highly flexible fabric, the several portions of which receive independent support and are independently yieldable for all practical purposes.

Figure 4:
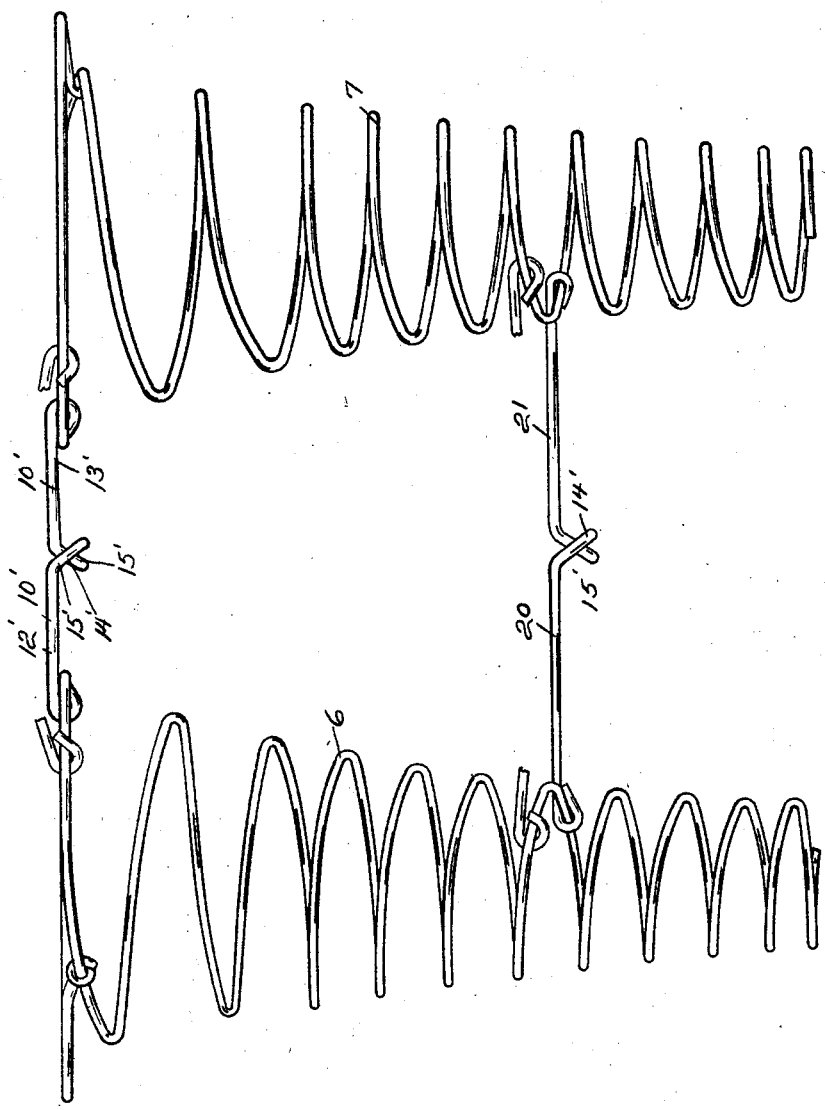
Figure 4 is an enlarged view in side elevation of two adjacent springs in a bed bottom, or like upholstery, as such springs appear when interconnected by a modified construction of link embodying this invention.

Figure 4 shows how a similar link construction is adapted to secure intermediate portions of the springs to each other in the manner already described with reference to the tops of the springs. Obviously, where intermediate ties are used, such ties should preferably embody this invention. Otherwise the beneficial results of the linkage used at the top of the springs will be lessened, due to the non-yielding characteristic of the linkage employed for the purpose of tying together the intermediate spring portion.

In Figure 4 the links 10' correspond to those already described with the exception that the leg portions 14' and 15' upon either side of the apices of a given link, instead of being bent oppositely from the common plane of the leg portions 12' and 13', are both bent in the same direction, which happens, in the present instance, to be downward. In other words, the entire apex of each link member is bodily offset angularly from the leg portions of the link member. This construction results in obtaining to a slightly lesser degree the flexibility which may be had through the use of the links previously described herein. The offset apices of the interacting links afford clearance for each other to a very considerable extent when formed as indicated in Figure 4.

In addition to the links which position the top coils of the springs of the upholstery, it will be noted that Figure 4 shows the application of similar links at 20 and 21, such links being made proportionately longer where the increased distance between the interconnected portions of the springs so requires. The apex portions 14' and 15' of links 20 and 21 may be formed exactly as the corresponding portions of links 10' are formed for use at the top of the springs. It will be understood of course that the use of these links at intermediate spring portions is referred to merely by way of exemplifying the fact that the links herein disclosed may be employed for various purposes other than their mere application to the top coils of upholstery springs.

I claim:

Means for flexibly inter-connecting the units of a coil spring assembly of the class described, comprising substantially V-shaped links inter-engaged at their apices and having their free ends in connection with adjacent coils, the apices of said links being substantially blunt and having circumflex bends whereby the sections of the links immediately adjacent their point of contact are oblique relative to the normal common plane of the links and at substantially right angles to each other, thus adapting the links for comparatively large relative angular or turning movement in any direction from their normal plane and enhancing the free movement of the individual inter-connected coils.

FREDERICK C. MARQUARDT.